US012667969B2

(12) United States Patent
Huang et al.

(10) Patent No.: US 12,667,969 B2
(45) Date of Patent: Jun. 30, 2026

(54) PARAMETER CALIBRATION METHOD, PARAMETER CALIBRATION SYSTEM AND NON-TRANSITORY COMPUTER READABLE MEDIUM

(71) Applicant: INDUSTRIAL TECHNOLOGY RESEARCH INSTITUTE, Hsinchu (TW)

(72) Inventors: Chao-Ping Huang, Hsinchu City (TW); Kuei-Ming Lee, Hsinchu City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 265 days.

(21) Appl. No.: 18/540,409

(22) Filed: Dec. 14, 2023

(65) Prior Publication Data

US 2025/0196357 A1 Jun. 19, 2025

(51) Int. Cl.
*B25J 9/16* (2006.01)
(52) U.S. Cl.
CPC ................................... B25J 9/1692 (2013.01)
(58) Field of Classification Search
CPC ....................................................... B25J 9/1692
See application file for complete search history.

(56) References Cited

U.S. PATENT DOCUMENTS 5,528,116 A * 6/1996 Snell ...................... B25J 9/1692
318/568.22
7,904,202 B2 3/2011 Hoppe
(Continued)

FOREIGN PATENT DOCUMENTS

CN 105066808 B 10/2017
CN 107369167 A 11/2017
(Continued)

OTHER PUBLICATIONS

Alici et al, "Prediction of Geometric Errors of Robot Manipulators with Particle Swarm Optimisation Method", Robotics and Autonomous Systems, vol. 54, Aug. 2006, pp. 956-966.
(Continued)

*Primary Examiner* — Abby Lin
*Assistant Examiner* — Danielle M Jackson
(74) *Attorney, Agent, or Firm* — Birch, Stewart, Kolasch & Birch, LLP

(57) ABSTRACT

A parameter calibration method includes: establishing a kinematic model function of the multi-link device, the kinematic model function comprising a parameter set; controlling the multi-link device to acquire N measurement points located on a first and a second planes of an object with a measurement tool, and recording N parameter sets as N initial parameter sets when the multi-link device acquires the N measurement points with the measurement tool, wherein the first and the second planes are parallel to each other and have a predetermined dimension; establishing a plurality of target functions associated with the N measurement points based on the N parameter sets and the kinematic model function; updating the N parameter sets based on the target functions to obtain N updated parameter sets; obtaining a parameter modification of the parameter set based on the N initial parameter sets and the N updated parameter sets.

20 Claims, 6 Drawing Sheets

(56) References Cited

U.S. PATENT DOCUMENTS

| | | | |
|---|---|---|---|
| 2006/0181236 A1* | 8/2006 | Brogardh | G05B 19/425 |
| | | | 318/568.1 |
| 2012/0197573 A1* | 8/2012 | Pecher | B25J 9/1692 |
| | | | 702/89 |
| 2014/0060230 A1* | 3/2014 | Nagayama | B25J 18/02 |
| | | | 901/27 |
| 2015/0314450 A1* | 11/2015 | Chiu | B25J 9/1692 |
| | | | 700/186 |
| 2023/0286140 A1 | 9/2023 | Usui | |
| 2024/0383145 A1* | 11/2024 | Chang | G01B 21/042 |
| 2026/0021586 A1* | 1/2026 | Duprez | B25J 9/1692 |

FOREIGN PATENT DOCUMENTS

| | | |
|---|---|---|
| CN | 105509671 B | 1/2018 |
| CN | 108406771 B | 3/2021 |
| CN | 113752253 A | 12/2021 |
| CN | 110072675 B | 4/2022 |
| CN | 115139338 A | 10/2022 |
| CN | 113843804 B | 3/2023 |
| TW | I601611 B | 10/2017 |
| TW | 202019642 A | 6/2020 |
| TW | I805437 B | 6/2023 |

OTHER PUBLICATIONS

Kuo et al., "PSO and Neural Network Based Intelligent Posture Calibration Method for Robot Arm", 2016 International Conference on Systems, Man, and Cybernetics (SMC 2016), IEEE, Oct. 2016, pp. 3095-3100.

Li et al., "Improving the Local Absolute Accuracy of Robot with Touch Panel", Proceedings of the 2017 International Conference on Robotics and Biomimetics, IEEE, Dec. 2017, pp. 1838-1843.

Meggiolaro et al., "Manipulator Calibration Using a Single End-point Contact Constraint", Proceedings of DETC2000, 2000 ASME Design Engineering Technical Conference, Sep. 2000, DETC2000/MECH-14129, pp. 1-9.

Nubiola et al., "Absolute Robot Calibration with a Single Telescoping Ballbar", Precision Engineering, vol. 38, Jan. 2014, pp. 472-480.

Zhong et al., "Autonomous Robot Calibration Using a Trigger Probe", Robotics and Autonomous Systems, vol. 18, 1996, pp. 395-410.

Taiwanese Office Action and Search Report for Taiwanese Application No. 113100125, dated Nov. 28, 2024.

* cited by examiner

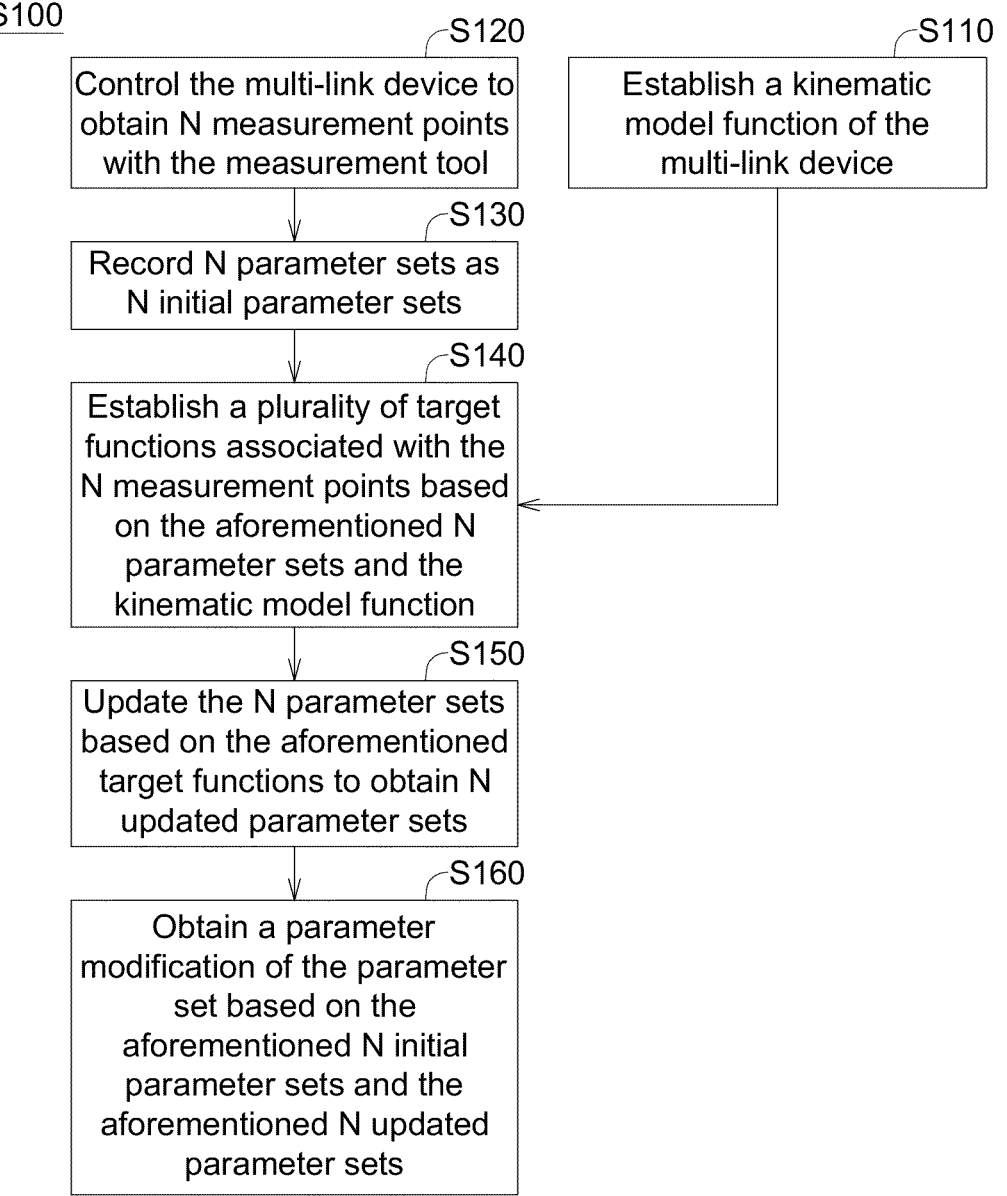

S100

Establish a kinematic model function of the multi-link device ~S110

Control the multi-link device to obtain N measurement points with the measurement tool ~S120

Record N parameter sets as N initial parameter sets ~S130

Establish a plurality of target functions associated with the N measurement points based on the aforementioned N parameter sets and the kinematic model function ~S140

Update the N parameter sets based on the aforementioned target functions to obtain N updated parameter sets ~S150

Obtain a parameter modification of the parameter set based on the aforementioned N initial parameter sets and the aforementioned N updated parameter sets ~S160

PARAMETER CALIBRATION METHOD, PARAMETER CALIBRATION SYSTEM AND NON-TRANSITORY COMPUTER READABLE MEDIUM

TECHNICAL FIELD

The disclosure relates to a parameter calibration method, a parameter calibration system and a non-transitory computer readable medium.

BACKGROUND

With the development of technology, the multi-link device can replace manpower to perform complex and high-precision operations to reduce cost and increase productivity. The precision and accuracy of the multi-link device are often affected due to factors such as geometrical errors, machining errors, assembly errors and so on between rods and joints. In order to pursue higher accuracy and precision of the multi-link device, it is necessary to minimize the error in the operation of the multi-link device caused by the difference between the actual value and the ideal value.

In view of this, a parameter calibration method, a parameter calibration system and a non-transitory computer readable medium are required to improve accuracy and precision.

SUMMARY

The disclosure is directed to a parameter calibration method, a parameter calibration system and a non-transitory computer readable medium.

According to one embodiment of the present disclosure, a parameter calibration method for a multi-link device is provided. The method includes the following steps. First, a kinematic model function of the multi-link device is established, and the kinematic model function includes a parameter set. Then, the multi-link device is controlled to acquire N measurement points with a measurement tool and record N parameter sets as N initial parameter sets when the multi-link device acquires the N measurement points with the measurement tool, wherein the N measurement points are located on a first plane and a second plane of an object, the first plane and the second plane are parallel to each other, and the first plane and the second plane are provided with a predetermined dimension therebetween. A plurality of target functions associated with the N measurement points are established based on the N parameter sets and the kinematic model function. Next, the N parameter sets are undated based on the target functions to obtain N updated parameter sets. Afterwards, a parameter modification of the parameter set is obtained based on the N initial parameter sets and the N updated parameter sets.

According to another embodiment of the present disclosure, a parameter calibration system for calibrating a multi-link device is provided. The parameter calibration system includes an object, a measurement tool, a control module and a parameter calculation module. The object has a first plane and a second plane, the first plane and the second plane are parallel to each other, and the first plane and the second plane are provided with a predetermined dimension therebetween. The measurement tool is mounted on an end of one of the multi-link device. The control module is configured for controlling the multi-link device to acquire N measurement points with the measurement tool, wherein the N measurement points are located on the first plane and the second plane of the object. The parameter calculation module is configured for: establishing a kinematic model function of the multi-link device, the kinematic model function including a parameter set; recording N parameter sets as N initial parameter sets when the multi-link device acquires the N measurement points with the measurement tool; establishing a plurality of target functions associated with the N measurement points based on the N parameter sets and the kinematic model function; updating the N parameter sets based on the target functions to obtain N updated parameter sets; and obtaining a parameter modification of the parameter set based on the N initial parameter sets and the N updated parameter sets.

According to a further embodiment of the present disclosure, a non-transitory computer readable medium for storing a program code causing a controller to perform a parameter calibration method for calibrating parameters of a multi-link device is provided, the parameter calibration method including: establishing a kinematic model function of the multi-link device, the kinematic model function comprising a parameter set; controlling the multi-link device to acquire N measurement points with a measurement tool, and recording N parameter sets as N initial parameter sets when the multi-link device acquires the N measurement points with the measurement tool, wherein the N measurement points are located on a first plane and a second plane of an object, the first plane and the second plane are parallel to each other, and the first plane and the second plane are provided with a predetermined dimension therebetween; establishing a plurality of target functions associated with the N measurement points based on the N parameter sets and the kinematic model function; updating the N parameter sets based on the target functions to obtain N updated parameter sets; and obtaining a parameter modification of the parameter set based on the N initial parameter sets and the N updated parameter sets.

For a better understanding of the foregoing and other embodiments of the present disclosure, the following embodiments are described in detail below, together with the accompanying drawings:

BRIEF DESCRIPTION OF THE DRAWINGS

FIG. 3 shows a flowchart of a parameter calibration method for the multi-link device according to one embodiment of the present disclosure.

DETAILED DESCRIPTION

In the present disclosure, a plurality of measurement points are obtained from two parallel planes to establish a plurality of target functions. A parameter set of a kinematic model function is updated by solving the target functions, and then a parameter modification of the parameter set is obtained. The parameter calibration method provided by the present disclosure may effectively improve the parameter error of the kinematic model function, and thus enhance the precision and accuracy of the multi-link device.

Each embodiment of the present disclosure will be described in detail below and illustrated with drawings. In addition to these detailed descriptions, the present disclosure may be broadly implemented in other embodiments, and easy substitutions, modifications, and equivalent variations of any of the described embodiments are encompassed within the scope of the present disclosure, and subject to the scope of the patent thereafter. In the description of the specification, many specific details and examples of embodiments are provided in order to provide the reader with a more complete understanding of the present disclosure; however, these specific details and examples of embodiments should not be considered as limitations of the present disclosure. In addition, well-known steps or components are not described in detail to avoid unnecessarily limiting the disclosure.

Figure 1:
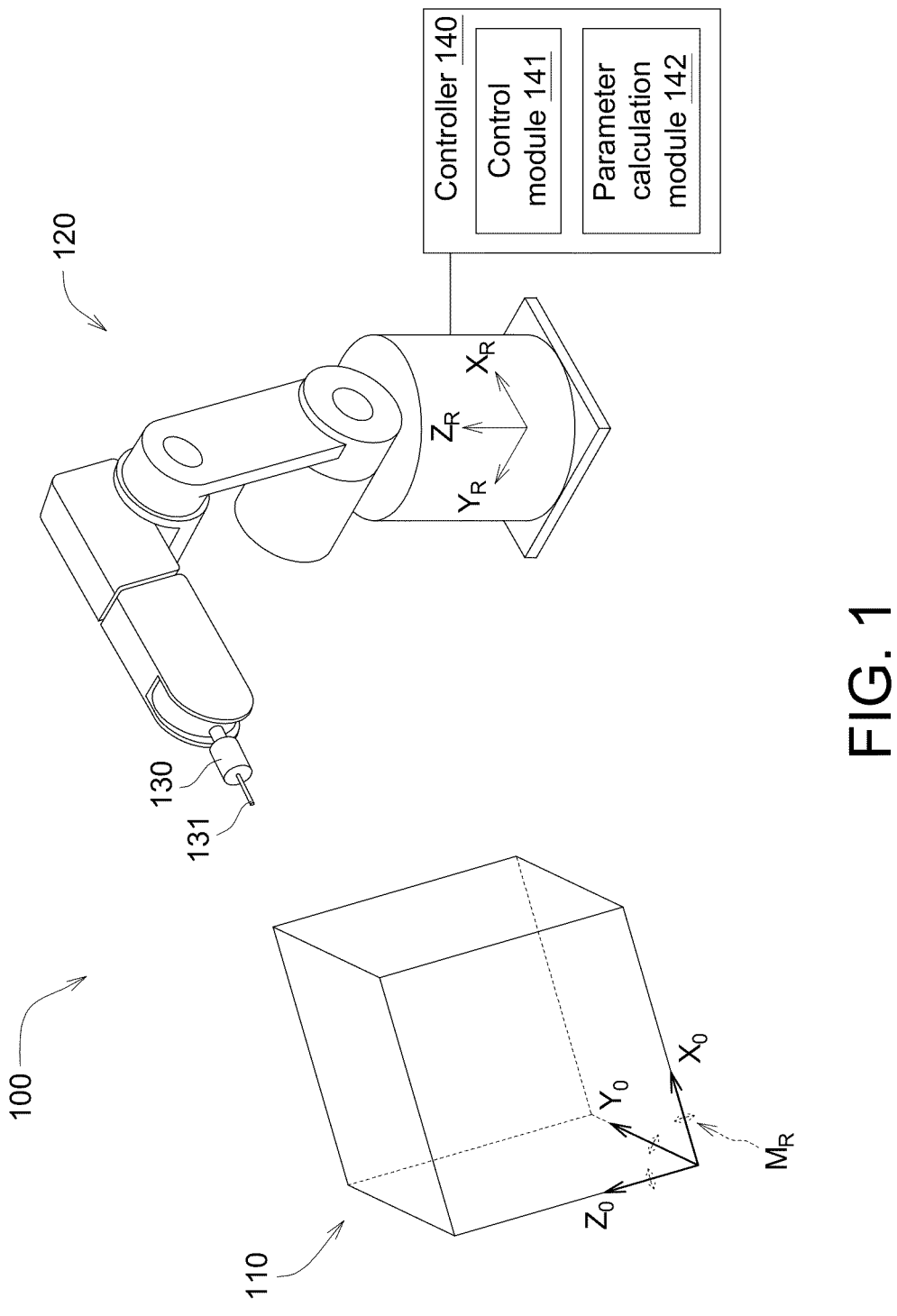
FIG. 1 shows a schematic diagram of a parameter calibration system for calibrating a multi-link device according to one embodiment of the present disclosure.
Figure 2:
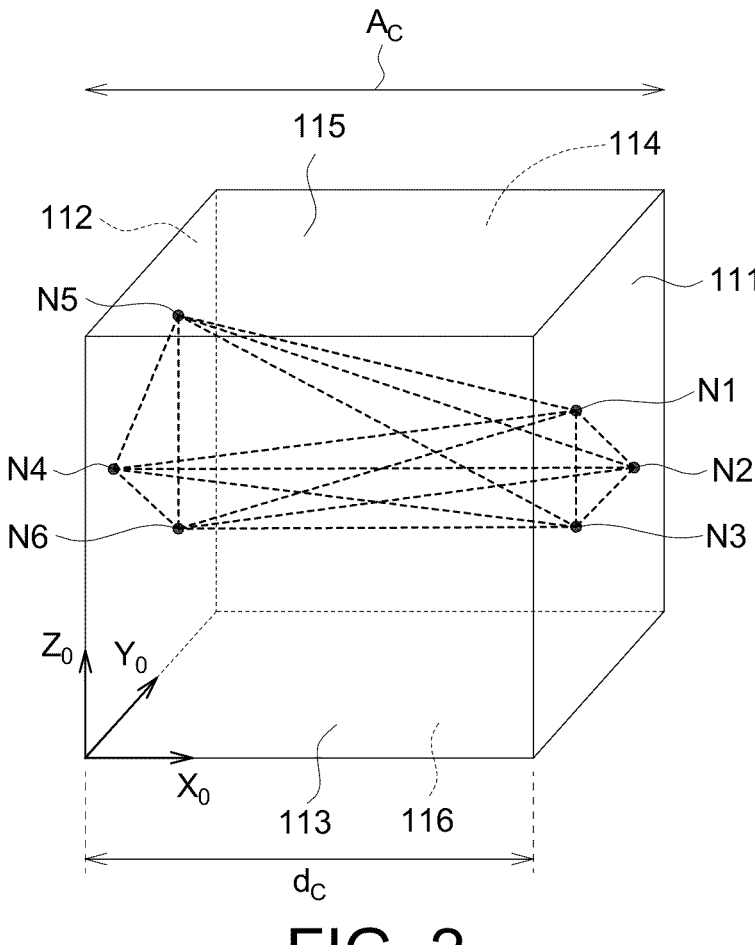
FIG. 2 shows a schematic diagram of an object according to one embodiment of the present disclosure.

FIG. 1 shows a schematic diagram of a parameter calibration system 100 for calibrating a multi-link device 120 according to one embodiment of the present disclosure; FIG. 2 shows a schematic diagram of an object 110 according to one embodiment of the present disclosure.

Referring to FIG. 1, the parameter calibration system 100 may be used for calibrating the multi-link device 120. The multi-link device 120 may be any linkage mechanism, such as but not limited to a robotic arm. The parameter calibration system 100 may include the object 110, a measurement tool 130 and a controller 140. The measurement tool 130 is mounted on an end of the multi-link device 120 and has a tool end 131. The movement of the multi-link device 120 may be described by a kinematic model function $K(\rho)$, wherein $\rho$ is a parameter set of the kinematic model function, which is the calibration target of the parameter calibration system 100.

The controller 140 is connected to the multi-link device 120, and may include a control module 141 and a parameter calculation module 142. The control module 141 and the parameter calculation module 142 may be implemented by a hardware circuit or software, such as a program code module, a firmware, or a chip. The control module 141 may be configured for controlling the movement of the multi-link device 120, such as controlling an actuator that actuates the links and/or joints of the multi-link device, so that the multi-link device 120 is capable of acquiring measurement points on the object 110 with the measurement tool 130 mounted on the end. During the collection of the measurement points by the multi-link device 120, the parameter calculation module 142 may receive data returned from the multi-link device 120, such as the distance and/or angle of change of the joint from the sensor (e.g., coder, optical scale, etc.) connected to the actuator.

The multi-link device 120 has a base coordinate system $X_R$-$Y_R$-$Z_R$, and the object 110 has a reference coordinate system $X_0$-$Y_0$-$Z_0$. Referring to FIG. 1 and FIG. 3, FIG. 3 shows a flowchart of a parameter calibration method S100 for the multi-link device 120 according to one embodiment of the present disclosure. In one embodiment, a program code may be stored by a non-transitory computer readable medium, and the parameter calibration method may be performed by the controller 140. In step S110, the parameter computation module 142 may establish a kinematic model function $K(\rho)$ of the multi-link device 120. $\rho$ is a parameter set of the kinematic model function, which may include fixed parameters and variable parameters which will change when the multi-link device 120 is operated. Wherein the fixed parameters are ideal values for the mechanical design of the multi-link device 120; the variable parameters are physical quantities that are driven by the actuator to change, such as the distance and/or angle of change of the joints from sensor (e.g., encoder, optical scale, etc.) connected to the actuator as described above. Substituting the parameter set p into the kinematic model function $K(\rho)$ yields the calculated coordinate position of the tool end 131 with respect to the base coordinate system $X_R$-$Y_R$-$Z_R$.

For example, in one embodiment, the kinematic model function $K(\rho)$ may be constructed using a Denavit-Hartenberg homogeneous coordinate transformation matrix (DH matrix). The parameter set p represents the entire set of the DH parameter, including link offset d, joint angle $\theta$, link length a, and link twist $\alpha$. Each link of the multi-link device 120 has its corresponding four DH parameters. If the multi-link device 120 contains k links, the parameter set $\rho$ of the entire multi-link device 120 has a total of 4 k DH parameters, which may be expressed as $\rho=\{d_1, \theta_1, a_1, \alpha_1, d_2, \theta_2, a_2, \alpha_2, \ldots, d_k, \theta_k, a_k, \alpha_k\}$. The multi-link device 120 obtains an initial parameter set when one of the measurement points is acquired. The initial parameter sets obtained at different measurement points by the multi-link device 120 are respectively different. For example, if the multi-link device 120 is a joint-type multi-link device, wherein each movable joint is mounted at a joint angle $\theta$, the joint angles $\theta$ obtained at different measurement points are not identical, but the link offsets d, the link lengths a, and the link torsions $\alpha$ are fixed. Therefore, in the present example, the link offset d, link length a, and link torsion $\alpha$ are fixed parameters, while the joint angle $\theta$ is a variable parameter. In other words, whether the DH parameter is variable or fixed depends on the mechanical design of the multi-link device 120. In another embodiment, if the design of the multi-link device 120 is to vary the length of the link, then the link offset d and the link length a may also be variable parameters.

When the multi-link device 120 obtains one of the measurement points on the object 110 with the measurement tool 130, the parameter calculation module 142 may read and record the variable parameter of the actuator, which is combined with the fixed parameter from the original manufacturer to form an initial parameter set, and then substitute the initial parameter set into the kinematic model function so as to obtain the calculated coordinate position of the tool end 131 with respect to the base coordinate system $X_R$-$Y_R$-$Z_R$.

However, the parameter set p of the kinematic model function is often not an ideal value due to external factors (such as assembly errors or manufacturing tolerances, etc.), and therefore the parameter set p needs to be calibrated and is the subject of the kinematic model function to be calibrated. In one embodiment, the coordinate obtained by substituting the parameter set $\rho$ into the kinematic model function $K(\rho)$ is not the correct coordinate. Assuming that there is a parameter modification $\Delta\rho$ which is a kind of translation error, and substituting the calibrated parameter set $\rho-\Delta\rho$ into the kinematic model function to obtain the coordinate of $K(\rho-\Delta p)$ so as to make the coordinate of $K(\rho-\Delta p)$ closer to the correct one. Therefore, the process of calibrating the parameters is to iteratively calculate $\Delta\rho$ so that the calibrated parameter set $\rho-\Delta\rho$ is closer to the real parameters. In another embodiment, a parameter modification which is described as the error ratio $\gamma$ may be added, so that $K(\gamma\rho-\Delta\rho)$ is closer to the real coordinate. Other error models may be adjusted so as to be applied to the present method and will not be described here. That is, it often takes several iterations to obtain a more accurate parameter modification; after the parameter modification is obtained, the parameter set with the parameter modification may be substituted into the kinematic model function to obtain the accurate calculated coordinate position, thereby improving the precision and accuracy of the multi-link device 120.

Generally, the coordinate system of the kinematic model function will be aligned with the base coordinate system $X_R$-$Y_R$-$Z_R$ of the multi-link device 120. Typically, as shown in FIG. 1, without the assistance of special measurement equipment or fixtures, the reference coordinate system $X_0$-$Y_0$-$Z_0$ of the object 110 and the base coordinate system $X_R$-$Y_R$-$Z_R$ of the multi-link device 120 will not be exactly aligned with each other, and thus the reference coordinate system $X_0$-$Y_0$-$Z_0$ of the object 110 and the coordinate system of the kinematic model function will not be aligned with each other. This will increase the complexity of the calculation. Referring to FIG. 1 and FIG. 2, in one embodiment, in order to simplify the process of parameter calibration, a conversion relationship $M_R$ between the reference coordinate system $X_0$-$Y_0$-$Z_0$ of the object 110 and the coordinate system of the kinematic model function may be established, and the conversion relationship $M_R$ is set on the base coordinate system $X_R$-$Y_R$-$Z_R$ of the multi-link device 120, so that the measurement axis (e.g., axis $X_0$) of the reference coordinate system $X_0$-$Y_0$-$Z_0$ of the object 110 may be aligned with the computational axis $A_C$ of the kinematic model function. In other words, the kinematic model function may further include a rotational parameter set to rotate the base coordinate system $X_R$-$Y_R$-$Z_R$ of the multi-link device 120, so that the measurement axis (e.g., axis $X_0$) of the reference coordinate system $X_0$-$Y_0$-$Z_0$ of the object 110 may be aligned with the computational axis $A_C$ of the kinematic model function, so as to simplify the computation and analysis of the subsequent calibration process. In this way, even if the object 110 is positioned in any attitude, it will not increase the complexity of computation and analysis in the subsequent calibration process. Of course, if the reference coordinate system $X_0$-$Y_0$-$Z_0$ of the object 110 is already aligned with the base coordinate system $X_R$-$Y_R$-$Z_R$ of the multi-link device 120 when the object 110 is positioned, the rotational parameter set may be omitted.

Referring to FIG. 1, FIG. 2 and FIG. 3, in step S120, the control module 141 controls the multi-link device 120 to obtain N measurement points with the measurement tool 130, wherein the N measurement points are located on the first plane 111 and the second plane 112 of the object 110, and the first plane 111 and the second plane 112 are parallel to each other. Herein, the first plane 111 and the second plane 112 are two planes perpendicular to the axis $X_0$. If the measurement axis of the reference coordinate system $X_0$-$Y_0$-$Z_0$ of the object 110 is the axis $X_0$, then the first plane 111 and the second plane 112 are also perpendicular to the computational axis $A_C$ of the kinematics model function. In addition, the first plane 111 and the second plane 112 are provided with a predetermined dimension $d_C$ therebetween defined by a distance between the first plane 111 and the second plane 112, and the predetermined dimension $d_C$ is also aligned with the computational axis $A_C$ of the kinematic model function.

In one embodiment, the measurement tool 130 may be a contact probe, and the contact probe may be used for sensing whether the tool end 131 (i.e., the end of the contact probe) touches the N measurement points on the object 110 to perform the collection of the measurement points by the multi-link device 120. In one embodiment, the control module 141 may control the multi-link device 120 so that the measurement tool 130 may touch the N measurement points on the object 110 in different attitudes. In one embodiment, the control may be automated by the control module 141, but the present disclosure is not limited thereto. In another embodiment, the control may be a manual control by an operator.

For example, as shown in FIG. 1 and FIG. 2, the measurement tool 130 may automatically or manually touch the measurement points N1-N3 on the first plane 111 of the object 110 first with different attitudes, and then touch the measurement points N4-N6 on the second plane 112 with other different attitudes. The number of the measurement points in FIG. 2 is just for example; the number of the measurement points collected may be greater than or equal to the number of the parameters to be calibrated, and the number of the measurement points acquired on the first plane 111 are not required to be equal to that on the second plane 112.

Referring to FIG. 1, FIG. 2 and FIG. 3, in step S130, when the multi-link device 120 acquires a measurement point with the measurement tool 130, the parameter calculation module 142 may record a parameter set of the multi-link device 120 at the time of acquiring the measurement point as an initial parameter set, which includes initial values of fixed parameters and variable parameters. If the measurement tool 130 is a contact probe, when the parameter calculation module 142 receives a contact signal from the measurement tool 130, the parameter calculation module 142 may record a corresponding initial parameter set. When the multi-link device 120 acquires N measurement points with the measurement tool 130, N parameter sets are obtained, and these N parameter sets are used as N initial parameter sets.

Next, in step S140, after the data related to the N measurement points have been collected, the parameter computation module 142 may establish a plurality of target functions associated with the N measurement points based on the aforementioned N parameter sets and the kinematic model function.

In one embodiment, the target function $F(\rho)=F(\rho_a,\rho_b)$ may be expressed as an expression of a subtraction of two coordinates in the kinematic model function $K(\rho)$ for two of the N measurement points from d, as follows:

$$[F(\rho)] = [F(\rho_a, \rho_b)] = [K(\rho_a) - K(\rho_b) - d]$$

Wherein d equals zero if the two measurement points belong to the first plane 111 or the second plane 112; d equals the predetermined dimension $d_C$ if the two measurement points belong to the first plane 111 and the second plane 112, respectively. $[F(\rho_a,\rho_b)]$ is the target function matrix, and $\rho_a$ and $\rho_b$ denote two parameter sets of the $a^{th}$ measurement point and $b^{th}$ measurement point, respectively, so that two computational coordinates of kinematic model function may be obtained by substituting the parameter set $\rho_a$ and the parameter set $\rho_b$ into the kinematic model function $K(\rho)$. If the measurement axis $X_0$ of the reference coordinate system $X_0$-$Y_0$-$Z_0$ of the object 110 has been aligned with the computational axis $A_C$ of the kinematic model function, then the two computational coordinates are the values on the computational axis $A_C$.

If there are N measurement points, then $$C_2^N$$

of the target functions $F(\rho_a, \rho_b)$ may be established. For example, as shown in FIG. 2, if the number of the N measurement points is 6, then 15 of the target functions $F(\rho_a, \rho_b)$ may be established. For instance, if the measurement points are N1 and N2, since the measurement points N1 and N2 belong to the first plane 111, the target function $F(\rho_1, \rho_2) = K(\rho_1) - K(\rho_2) - 0$ may be established. If the measurement points are N1 and N4, since the measurement points N1 and N4 belong to the first plane 111 and the second plane 112, respectively, the target function $F(\rho_1, \rho_4) = K(\rho_1) - K(\rho_4) - d_C$ may be established. In this manner, 15 of the target functions $F(\rho_a, \rho_b)$ are established one by one and may be transformed into a target function matrix $[F(\rho_a, \rho_b)]_{15 \times 1}$.

Referring to FIG. 1, FIG. 2 and FIG. 3, then in step S150, the parameter computation module 142 may update the N parameter sets based on the aforementioned target functions to obtain N updated parameter sets. In one embodiment, the parameter computation module 142 may solve these target functions to obtain the N updated parameter sets.

Figure 4:
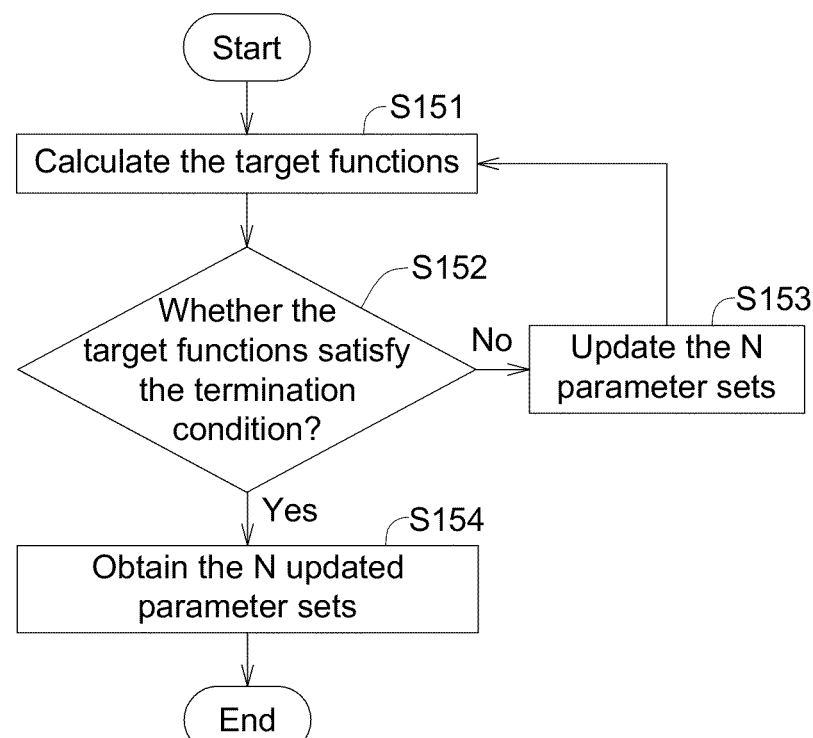
FIG. 4 is one embodiment of the step of updating the N parameter sets based on the target functions.

For example, referring to FIG. 4, which is one embodiment of the step S150 of updating the N parameter sets based on the target functions. In the present embodiment, the solving algorithm used may be Newton's method, but it may also be other types of algorithms, such as bisection method, fixed point iteration method, secant method, genetic algorithm, particle swarm optimization, deep learning, and the like. In step S151, the parameter calculation module 142 calculates the target functions. The parameter computation module 142 may establish equations based on the target functions and associate all equations to solve. If the parameter set of the kinematic model function is not a correct solution, the target functions do not satisfy the termination condition. For example, in step S152, when the parameter computation module 142 determines that the target functions do not satisfy the termination condition, the parameter computation module 142 updates the parameter set of the kinematic model function according to Newton's method. The method of updating the parameter set may be described as follows:

$$[\rho']_{N \times 1} = [\rho]_{N \times 1} - \Delta\rho = [\rho]_{N \times 1} - [J(\rho)]^+[F(\rho)]$$

Wherein $\rho'$ is the updated parameter set, $J(\rho)$ is the Jacobian matrix, which is the partial derivative of $F(\rho)$ with respect to $\rho$; $\Delta\rho = [J(\rho)]^*[F(\rho)]$ is the parameter modification, and $[J(\rho)]^+$ denotes the pseudo-inverse matrix of $[J(\rho)]$. In this way, the parameter sets may be updated, and the method returns to step S151 to substituting the updated parameter sets into the target functions and repeats the loop of S151-S153 until the termination condition is satisfied, at which time the last updated N parameter sets are referred to as the N updated parameter sets. For example, in step S154, the N updated parameter sets are obtained. In one embodiment, when the square root of the target function matrix is lower than the accuracy of the measurement tool 130, the calculation accuracy requirement is met, which may be set as the termination condition of the calculation.

After the N updated parameter sets are obtained, referring to FIG. 1 and FIG. 3, in step S160, the parameter calculation module 142 obtains a parameter modification of the parameter set based on the N initial parameter sets obtained in step S130 and the N updated parameter sets obtained in step S150. In one example, the parameter modification of the parameter set may be obtained by comparing the differences between the N initial parameter sets and the N updated parameter sets. The original parameter set $\rho$ is calibrated according to the parameter modification $\Delta\rho$ to obtain the calibrated parameter set $\rho - \Delta p$. Substituting the calibrated parameter set $\rho - \Delta\rho$ into the kinematic model function, the accurate calculated coordinate position may be obtained.

Figure 5:
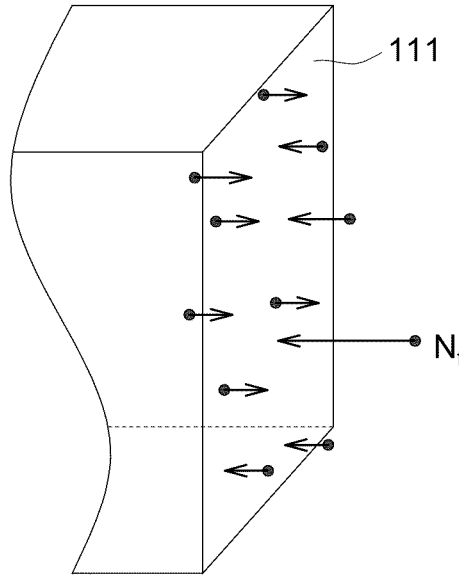
FIG. 5 shows one embodiment that excludes an anomalous measurement point.

In addition, in one embodiment, the improvement rate of the parameter calibration method of the present disclosure may be further enhanced by excluding an anomalous measurement point. FIG. 5 shows one embodiment that excludes an anomalous measurement point $N_f$. Referring to FIG. 3 and FIG. 5, after step S160 is completed, the calibrated parameter set $\rho - \Delta\rho$ may be further substituted into the kinematic model function according to the parameter modification $\Delta\rho$ to obtain the computational coordinate of each measurement point in the kinematic model function, and the average of the computational coordinates of all the measurement points on the first plane and the average of the computational coordinates of all the measurement points on the second plane are calculated, respectively. If the difference between the computational coordinate of one measurement point $N_f$ on the first plane 111 and the average is greater than a threshold value, the measurement point $N_f$ is considered to be an anomalous measurement point. In one embodiment, a reasonable distribution range is set within three standard deviations before and after the average of the computational coordinates of all the measurement points, and any measurement point outside this range is considered anomalous. After excluding the anomalous measurement point, the method returns to step S140 to obtain a plurality of target functions associated with the remaining N−1 measurement points and continues the subsequent computation and analysis.

Table 1 shows the simulation result of the parameter calibration method for calibrating parameters according to one embodiment of the present disclosure, wherein the multi-link device is modelled using a Denso VS6556E robot arm. Nominal value is the original value of the parameters that has not been calibrated, such as the parameters set by the original manufacturer. The calibration value is the calibrated parameters obtained by the parameter calibration method of one embodiment of the present disclosure. As shown in Table 1, the parameter error may be greatly reduced by the parameter calibration method of one embodiment of the present disclosure, and there is a significant improvement rate.

TABLE 1

| Parameters | Ideal value (mm) | Nominal value (mm) | Error (mm) | Calibrated value (mm) | Error after calibration (mm) | Improvement rate (%) |
|---|---|---|---|---|---|---|
| $a_1$ | 75 | 80 | 5 | 75.0163 | 0.0163 | 99.67 |
| $a_2$ | 270 | 275 | 5 | 270.0004 | 0.0004 | 99.99 |
| $a_3$ | 90 | 95 | 5 | 90.0124 | 0.0124 | 99.75 |
| $a_6$ | 0 | 5 | 5 | −0.0039 | −0.0039 | 99.92 |
| $d_3$ | 0 | 5 | 5 | −0.0027 | −0.0027 | 99.95 |
| $d_4$ | 295 | 300 | 5 | 294.997 | −0.0030 | 99.94 |
| $d_6$ | 80 | 85 | 5 | 80.0094 | 0.0094 | 99.81 |

Figure 6:
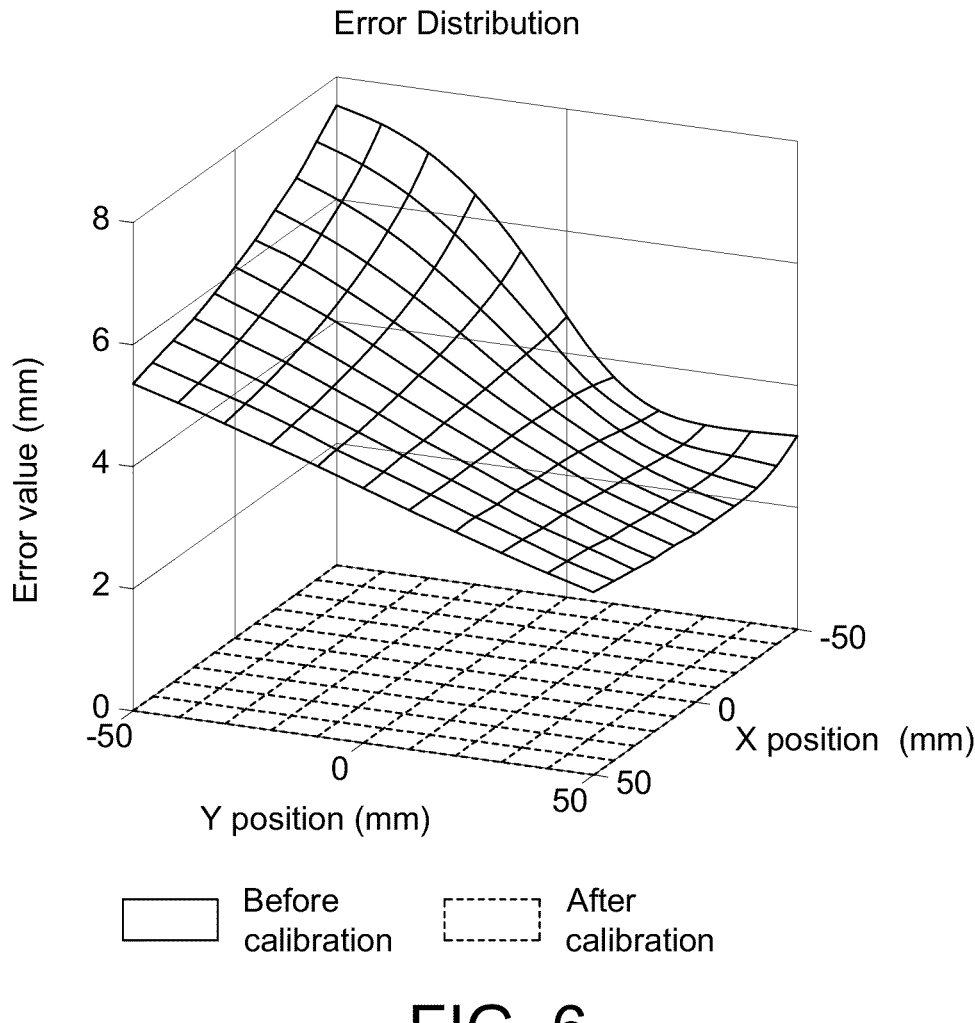
FIG. 6 and FIG. 7 show simulation results of the parameter calibration method provided in accordance with one embodiment of the present disclosure.
Figure 7:
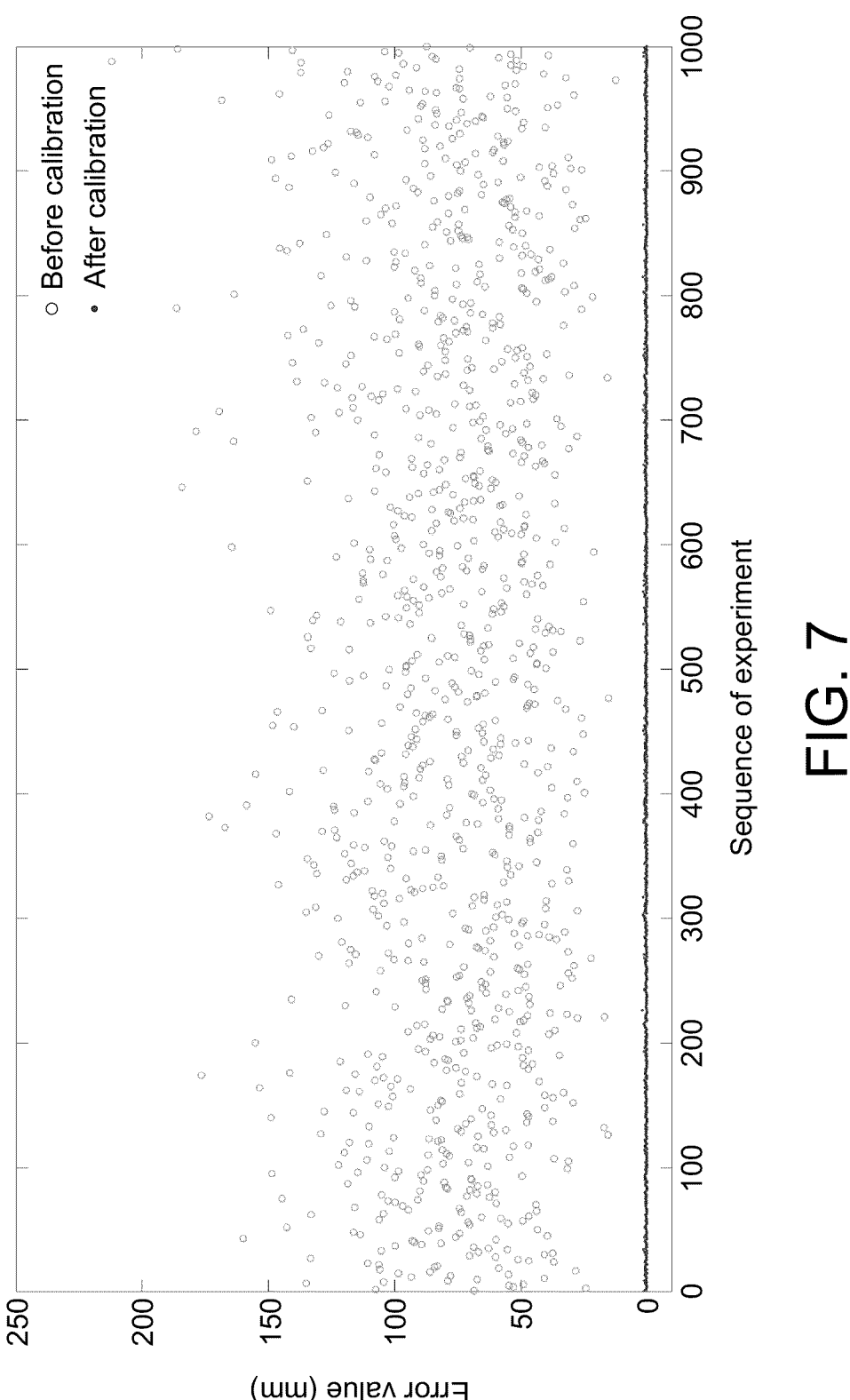

In addition, referring to FIG. 6 and FIG. 7, which show the simulation results of the parameter calibration method provided according to one embodiment of the present disclosure. It may be seen that even if multiple simulations are performed at different positions or under random conditions, the error may be significantly reduced, and the precision and accuracy of the multi-link device may be improved.

Although the foregoing measurement points are exemplified to be located on the first plane 111 and the second plane 112 of the object 110 for illustrative purpose, it should be understood that similar parameter calibration methods may also be performed on other parallel planes of the object, such as the third plane 113 and the fourth plane 114, as well as the fifth plane 115 and the sixth plane 116 (which is required to be rotated to an angle that allows for acquiring the measurement points).

In summary, according to the parameter calibration method provided in the present disclosure, a plurality of measurement points are obtained from two parallel planes to establish a plurality of target functions. A parameter set of a kinematic model function is updated by solving the target functions, and then a parameter modification of the parameter set is obtained. Since the measurement points are restricted to two parallel planes, the computational difficulty may be greatly reduced. Moreover, according to the parameter calibration method provided in the present disclosure, the absolute values of the parameters of the kinematic model function may be obtained instead of only the relative values, thus, the parameter error of the kinematic model function may be effectively improved, and the precision and accuracy of the multi-link device may be enhanced.

Although the present disclosure has been disclosed above by way of embodiments, it is not intended to limit the present disclosure. Those skilled in the art may make various variations and modifications without departing from the spirit and scope of the present disclosure. Therefore, the protection scope of the present disclosure shall be as defined in the following claims attached hereto.

The invention claimed is:

1. A parameter calibration method for a multi-link device, the parameter calibration method comprising:
    establishing a kinematic model function of the multi-link device, the kinematic model function comprising a parameter set;
    controlling the multi-link device to acquire N measurement points with a measurement tool, and recording N parameter sets as N initial parameter sets when the multi-link device acquires the N measurement points with the measurement tool, wherein the N measurement points are located on a first plane and a second plane of an object, the first plane and the second plane are parallel to each other, and the first plane and the second plane of the object are provided with a predetermined dimension therebetween;
    establishing a plurality of target functions associated with the N measurement points based on the N parameter sets and the kinematic model function, wherein each of the target functions is expressed as an expression of a subtraction of two computational coordinates in the kinematic model function for two measurement points of the N measurement points from d, the two computational coordinates are obtained by substituting two parameter sets corresponding to the two measurement points into the kinematic model function;
    d equals zero in response to the two measurement points belonging to the first plane or the second plane;
    updating the N parameter sets based on the target functions to obtain N updated parameter sets; and
    obtaining a parameter modification of the parameter set based on the N initial parameter sets and the N updated parameter sets.

2. The parameter calibration method according to claim 1, wherein in the step of acquiring N measurement points with the measurement tool, the measurement tool touches the N measurement points on the object.

3. The parameter calibration method according to claim 2, wherein the multi-link device is controlled so that the measurement tool touches the N measurement points on the object in different attitudes.

4. The parameter calibration method according to claim 2, wherein the N initial parameter sets are recorded when a contact signal is received from the measurement tool.

5. The parameter calibration method according to claim 1, wherein the kinematic model function further comprises a rotational parameter set such that a computational axis of the kinematic model function is aligned with the predetermined dimension, the first plane and the second plane being perpendicular to the computational axis.

6. The parameter calibration method according to claim 5, wherein the rotational parameter set is related to a conversion relationship between a base coordinate system of the multi-link device and a reference coordinate system of the object.

7. The parameter calibration method according to claim 5, wherein
    d equals the predetermined dimension in response to the two measurement points belonging to the first plane and the second plane, respectively.

8. The parameter calibration method according to claim 7, wherein the two computational coordinates are values of the computational axis.

9. The parameter calibration method according to claim 1, wherein a number of the N measurement points is greater than or equal to a number of parameters of the parameter set.

10. The parameter calibration method according to claim 1, wherein in the step of updating the N parameter sets based on the target functions, the N updated parameter sets are obtained by solving the target functions.

11. A parameter calibration system for calibrating a multi-link device comprising:
    an object having a first plane and a second plane, the first plane and the second plane being parallel to each other, and the first plane and the second plane of the object provided with a predetermined dimension therebetween;
    a measurement tool mounted on an end of one of the multi-link device;
    a control module configured for controlling the multi-link device to acquire N measurement points with the measurement tool, wherein the N measurement points are located on the first plane and the second plane of the object; and
    a parameter calculation module configured for:
        establishing a kinematic model function of the multi-link device, the kinematic model function comprising a parameter set;
        recording N parameter sets as N initial parameter sets when the multi-link device acquires the N measurement points with the measurement tool;
        establishing a plurality of target functions associated with the N measurement points based on the N parameter sets and the kinematic model function, wherein each of the target functions is expressed as an expression of a subtraction of two computational coordinates in the kinematic model function for two measurement points of the N measurement points from d, the two computational coordinates are obtained by substituting two parameter sets corresponding to the two measurement points into the kinematic model function;

d equals zero in response to the two measurement points belonging to the first plane or the second plane;

updating the N parameter sets based on the target functions to obtain N updated parameter sets; and obtaining a parameter modification of the parameter set based on the N initial parameter sets and the N updated parameter sets.

12. The parameter calibration system according to claim 11, wherein the measurement tool is a contact probe for sensing whether an end of the contact probe touches the N measurement points on the object.

13. The parameter calibration system according to claim 12, wherein the parameter calculation module records the N initial parameter sets when receiving a contact signal from the measurement tool.

14. The parameter calibration system according to claim 11, wherein the kinematic model function further comprises a rotational parameter set, the parameter calculation module aligns a computational axis of the kinematic model function with the predetermined dimension by calibrating the rotational parameter set, the first plane and the second plane being perpendicular to the computational axis.

15. The parameter calibration system according to claim 14, wherein the rotational parameter set is related to a conversion relationship between a base coordinate system of the multi-link device and a reference coordinate system of the object.

16. The parameter calibration system according to claim 14, wherein d equals the predetermined dimension in response to the two measurement points belonging to the first plane and the second plane, respectively.

17. The parameter calibration system according to claim 16, wherein the two computational coordinates are values of the computational axis.

18. The parameter calibration system according to claim 11, wherein a number of the N measurement points is greater than or equal to a number of parameters of the parameter set.

19. The parameter calibration system according to claim 11, wherein the parameter calculation module obtains the N parameter sets by solving the target functions.

20. A non-transitory computer readable medium for storing a program code causing a controller to perform a parameter calibration method for calibrating parameters of a multi-link device, wherein the parameter calibration method comprises:

establishing a kinematic model function of the multi-link device, the kinematic model function comprising a parameter set;

controlling the multi-link device to acquire N measurement points with a measurement tool, and recording N parameter sets as N initial parameter sets when the multi-link device acquires the N measurement points with the measurement tool, wherein the N measurement points are located on a first plane and a second plane of an object, the first plane and the second plane are parallel to each other, and the first plane and the second plane of the object are provided with a predetermined dimension therebetween;

establishing a plurality of target functions associated with the N measurement points based on the N parameter sets and the kinematic model function, wherein each of the target functions is expressed as an expression of a subtraction of two computational coordinates in the kinematic model function for two measurement points of the N measurement points from d, the two computational coordinates are obtained by substituting two parameter sets corresponding to the two measurement points into the kinematic model function;

d equals zero in response to the two measurement points belonging to the first plane or the second plane;

updating the N parameter sets based on the target functions to obtain N updated parameter sets; and obtaining a parameter modification of the parameter set based on the N initial parameter sets and the N updated parameter sets.

\* \* \* \* \*